United States Patent
Chiba

(10) Patent No.: US 11,837,092 B2
(45) Date of Patent: Dec. 5, 2023

(54) DRIVING ASSISTANCE APPARATUS AND VEHICLE

(71) Applicant: HONDA MOTOR CO., LTD., Tokyo (JP)

(72) Inventor: Takeshi Chiba, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 48 days.

(21) Appl. No.: 17/676,907

(22) Filed: Feb. 22, 2022

(65) Prior Publication Data

US 2022/0292966 A1  Sep. 15, 2022

(30) Foreign Application Priority Data

Mar. 11, 2021  (JP) ................................ 2021-039459

(51) Int. Cl.
*G08G 1/0967* (2006.01)
*G07C 5/00* (2006.01)
*G07C 5/02* (2006.01)

(52) U.S. Cl.
CPC ....... *G08G 1/096791* (2013.01); *G07C 5/008* (2013.01); *G07C 5/02* (2013.01)

(58) Field of Classification Search
CPC ..... G08G 1/096791; G07C 5/008; G07C 5/02
USPC ....................................................... 340/905
See application file for complete search history.

(56) References Cited

U.S. PATENT DOCUMENTS

| 8,489,316 | B1* | 7/2013 | Hedges | G01C 21/30 701/300 |
| 9,352,778 | B2* | 5/2016 | Yoon | B62D 15/025 |
| 9,475,430 | B2* | 10/2016 | Kitaura | H04N 7/181 |
| 2007/0040705 | A1* | 2/2007 | Yoshioka | G01C 21/3867 340/988 |
| 2010/0253541 | A1* | 10/2010 | Seder | G08G 1/0962 340/905 |
| 2012/0277965 | A1* | 11/2012 | Takahashi | B60W 30/143 701/70 |
| 2013/0131947 | A1* | 5/2013 | Takahashi | B60T 7/18 701/70 |
| 2015/0066270 | A1* | 3/2015 | Ogawa | B60L 53/64 701/400 |
| 2015/0088382 | A1* | 3/2015 | Obuchi | B60W 30/00 701/41 |
| 2016/0097645 | A1* | 4/2016 | Davidsson | G08B 31/00 701/409 |
| 2017/0076599 | A1* | 3/2017 | Gupta | B60Q 9/00 |
| 2017/0076600 | A1* | 3/2017 | Scofield | H04L 67/306 |
| 2017/0116854 | A1* | 4/2017 | Sugawara | G08G 1/0129 |

(Continued)

FOREIGN PATENT DOCUMENTS

JP  2019-064562 A  4/2019

*Primary Examiner* — Kerri L McNally
*Assistant Examiner* — Thang D Tran
(74) *Attorney, Agent, or Firm* — Thomas | Horstemeyer, LLP

(57) ABSTRACT

A driving assistance apparatus in a vehicle, the driving assistance apparatus comprising an acquisition unit configured to acquire a location coordinate of a self-vehicle at a predetermined period of time, a specification unit configured, based on a plurality of the location coordinates acquired continuously by the acquisition unit, to specify a curved region of a road, and a registration unit configured to register the curved region specified by the specification unit in a database predetermined.

12 Claims, 8 Drawing Sheets

(56) References Cited

U.S. PATENT DOCUMENTS

| | | | |
|---|---|---|---|
| 2019/0051172 A1* | 2/2019 | Stenneth | G08G 1/163 |
| 2019/0147739 A1* | 5/2019 | Takeyama | H04L 67/12 |
| | | | 701/516 |
| 2019/0287406 A1* | 9/2019 | Kurehashi | G08G 1/0145 |
| 2019/0322276 A1* | 10/2019 | Narmack | B60W 40/09 |
| 2020/0026305 A1* | 1/2020 | Maekawa | G05D 1/0289 |
| 2020/0225044 A1* | 7/2020 | Tohriyama | G01C 21/3815 |
| 2021/0199463 A1* | 7/2021 | Kitahara | B60W 60/001 |
| 2021/0239474 A1* | 8/2021 | Tsuruoka | B62D 15/0285 |
| 2022/0090933 A1* | 3/2022 | Corbiere | B60W 40/072 |
| 2022/0135062 A1* | 5/2022 | Seitz | B60W 50/14 |
| | | | 701/23 |
| 2022/0289178 A1* | 9/2022 | Hagiwara | H04W 4/023 |
| 2022/0289210 A1* | 9/2022 | Hagiwara | B60W 50/0098 |
| 2022/0402489 A1* | 12/2022 | Engel | B60W 30/045 |

\* cited by examiner

DRIVING ASSISTANCE APPARATUS AND VEHICLE

CROSS-REFERENCE TO RELATED APPLICATION(S)

This application claims priority to and the benefit of Japanese Patent Application No. 2021-039459 filed on Mar. 11, 2021, the entire disclosure of which is incorporated herein by reference.

BACKGROUND OF THE INVENTION

Field of the Invention

The present invention relates to a driving assistance apparatus mounted in a vehicle.

Description of the Related Art

When a vehicle travels, the vehicle has a risk of an unexpected slip at a curved region having a relatively small turning radius. Thus, in some cases, a driver of the vehicle needs to previously recognize the curved region. Meanwhile, in some cases, the driver is able to previously recognize such a curved region using driving assistance based on map data (disclosed in Japanese Patent Laid-Open No. 2019-064562).

However, in some cases such as a case where the map data is not prepared, a case where it is difficult to acquire the map data in the vehicle, or a case where the vehicle is not configured to acquire the map data, driving assistance not using the map data is required.

SUMMARY OF THE INVENTION

With the present invention, it is possible with a relatively simple configuration to achieve management of risks in a travel path.

One of the aspects of the present invention provides a driving assistance apparatus in a vehicle, the driving assistance apparatus comprising an acquisition unit configured to acquire a location coordinate of a self-vehicle at a predetermined period of time, a specification unit configured, based on a plurality of the location coordinates acquired continuously by the acquisition unit, to specify a curved region of a road, and a registration unit configured to register the curved region specified by the specification unit in a database predetermined.

Further features of the present invention will become apparent from the following description of exemplary embodiments with reference to the attached drawings.

DESCRIPTION OF THE EMBODIMENTS

Figure 1:
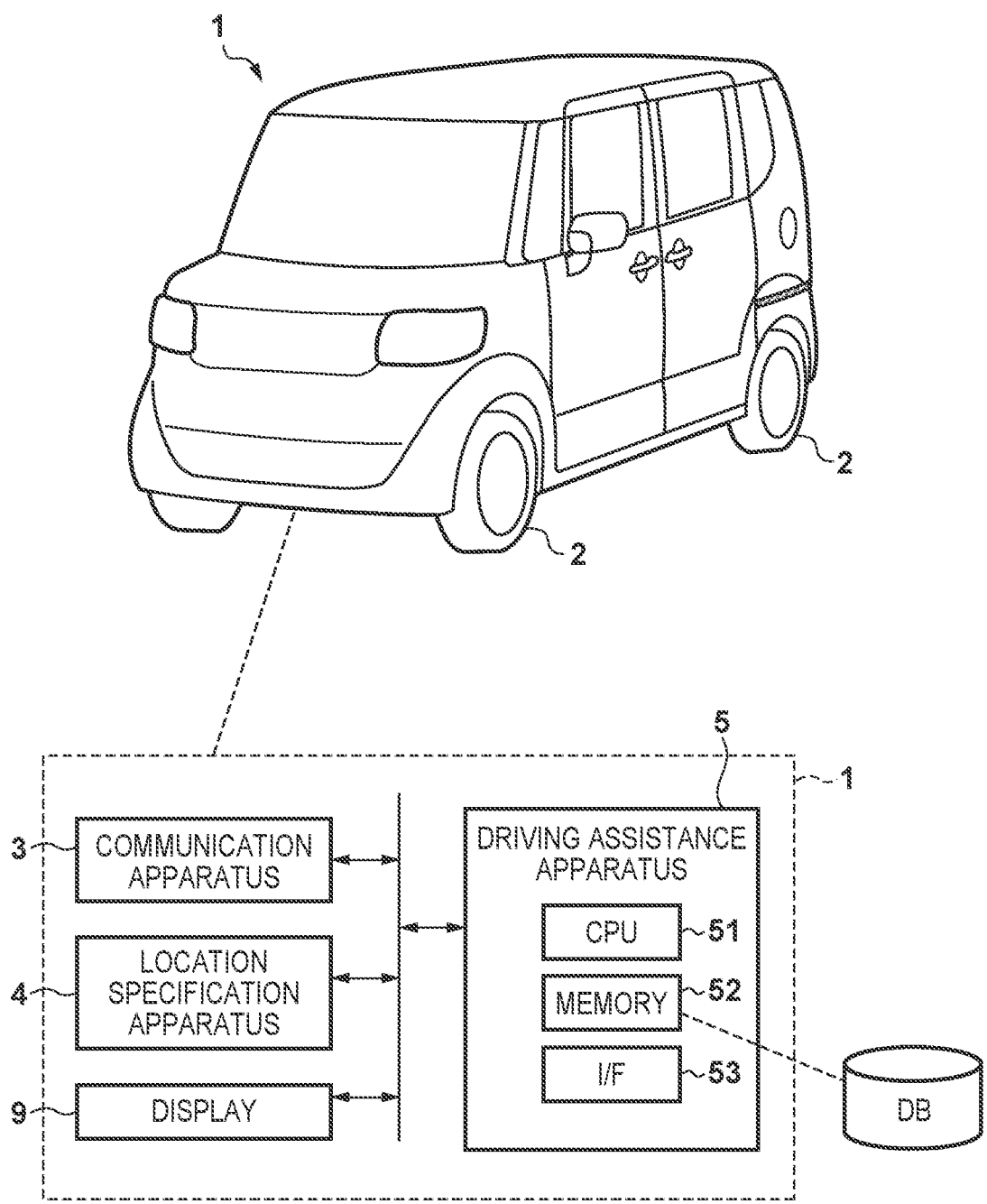
FIG. 1 is a diagram illustrating an example of a configuration of a vehicle according to an embodiment.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a diagram illustrating an example of a configuration of a vehicle 1 according to a first embodiment. The vehicle 1 includes a wheel 2, a communication apparatus 3, a location specification apparatus 4, and a driving assistance apparatus 5. In this embodiment, the vehicle 1 is a four-wheel vehicle including four of the wheels 2, but the number of the wheels 2 is not limited thereto. As another embodiment, the vehicle 1 may be a two-wheel vehicle, a three-wheel vehicle, or others.

The communication apparatus 3 is configured to achieve vehicle-to-vehicle communication or road-to-vehicle communication, based on which information required for a driver to proceed with a driving operation (e.g., congestion information, accident information, weather information, or road surface information) is acquired. In this embodiment, the communication apparatus 3 is additionally configured to communicate with a server via a network, based on which map data predetermined is acquired. As another embodiment, the map data predetermined may be stored in a storage apparatus that is installed in the vehicle 1.

The location specification apparatus 4 includes a global positioning system (GPS) sensor, based on which a location coordinate of a self-vehicle 1 is specified in latitude and longitude. For example, the location specification apparatus 4 specifies that the self-vehicle 1 is traveling at 35 degrees north latitude and 139 degrees east longitude.

The driving assistance apparatus 5 includes a central processing unit (CPU) 51, a memory 52, and an external communication interface 53, and is configured to provide driving assistance as will be described later. The computational processing for the driving assistance is conducted when the CPU 51 develops and executes a predetermined program in the memory 52. The driving assistance apparatus 5 has a function that may be achieved by an application specific integrated circuit (ASIC), in other words, may be achieved by any one of hardware and software.

Based on the location coordinate specified by the location specification apparatus 4, the driving assistance apparatus 5 displays, on an in-vehicle display 9, the self-vehicle 1 in correspondence to the map data. For example, the communication apparatus 3 acquires the map data corresponding to the location coordinate specified, and the driving assistance apparatus 5 displays, on the in-vehicle display 9, the map data acquired together with the self-vehicle 1 (or an icon indicating the self-vehicle 1).

On the other hand, in some cases, it is not possible for the driving assistance apparatus 5 to refer to the map data. These cases include, for example, a case where the map data is not prepared due to a road additionally installed or others, and a case where poor communication environment or the like makes it difficult to acquire the map data. These cases include, for another example, a case where the communication apparatus 3 is not installed in the vehicle 1 and thus the vehicle 1 is not configured to acquire the map data.

In these cases above, the information required for the driver to proceed with the driving operation is not sufficient, thereby causing, for example, an occurrence of slip of the vehicle 1 at an unexpected curved region. Thus, the driving assistance apparatus 5 is required to cause the driver of the vehicle 1 to previously recognize the curved regions.

Figure 2:
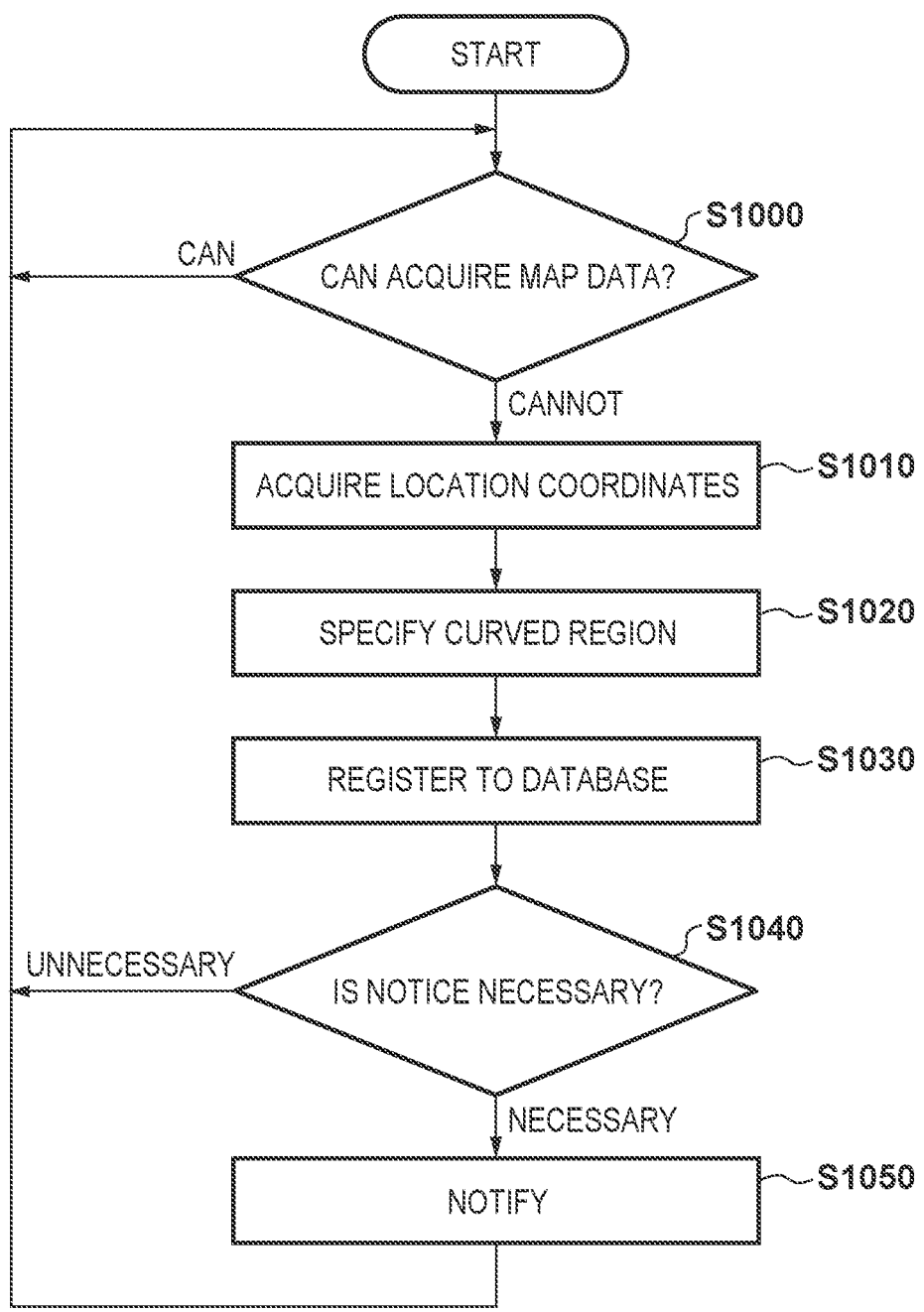
FIG. 2 is a flowchart describing an example of content of computational processing of a driving assistance apparatus.

FIG. 2 is a flowchart describing an example of content of computational processing conducted by the driving assistance apparatus 5 for driving assistance. Steps of this flowchart are mainly executed by the CPU 51, and a summary of the steps is: to periodically acquire the location coordinate of the self-vehicle 1 so as to specify the curved region; and to register the curved region in a database.

In step S1000 (hereinafter, simply referred to as "S1000", and the same applies to the other steps as will be described later), the driving assistance apparatus 5 determines whether or not it is possible to acquire the map data. When it is possible to acquire the map data, the driving assistance apparatus 5 returns to S1000, and when it is not possible, the driving assistance apparatus 5 proceeds to S1010. In other words, the steps of this flowchart are executed when it is not possible to acquire the map data. In S1000, the CPU 51 functions as a determination unit.

In S1010, the driving assistance apparatus 5 acquires the location coordinates (coordinates P10, P11, or others as will be described later (see FIG. 3)) of the self-vehicle 1. Each of the location coordinates is acquired based on the GPS, and each of the location coordinates acquired is temporarily stored in the memory 52. In S1010, the CPU 51 functions as an acquisition unit.

In this flowchart, S1010 is periodically repeated when it is not possible to acquire the map data (see S1000). As a result, each of the location coordinates acquired periodically is temporarily stored in the memory 52.

In S1020, based on the location coordinates acquired continuously and stored in the memory 52 in S1010, the driving assistance apparatus 5 specifies the curved region of the road (a curved region CR1 as will be described later (see FIG. 3)). A method to specify the curved region will be described in detail later. In S1020, the CPU 51 functions as a specification unit.

In S1030, the driving assistance apparatus 5 registers the curved region CR1 (specified in S1020) in the memory 52 as a database DB (see FIG. 1). In S1030, the CPU 51 functions as a registration unit.

In S1040, the driving assistance apparatus 5 refers to the database DB to determine whether or not a notice predetermined, to the driver, is necessary. The driving assistance apparatus 5 determines based on, for example, whether or not the self-vehicle 1 is traveling in the curved region CR1 that has been already/previously registered in the database DB. On determination that the notice is necessary, the driving assistance apparatus 5 proceeds to S1050; and on determination that the notice is not necessary, the driving assistance apparatus 5 returns to S1000. In S1040, the CPU 51 functions as the determination unit.

In S1050, the driving assistance apparatus 5 provides the driver with the notice predetermined. The notice may be provided via the in-vehicle display 9 or may alternatively/incidentally be provided via an audio guide or a warning alarm. In S1050, the CPU 51 functions as a notification unit (or a notice output unit) or a display unit (or a display output unit).

In this embodiment, when the vehicle 1 travels again in the curved region CR1 registered in S1030, in S1040 to S1050, the driving assistance apparatus 5 provides the driver with the notice predetermined. As another embodiment, the driving assistance apparatus 5 may provide the driver with the notice when the vehicle 1 travels for the first time in the curved region CR1 (substantially simultaneously with when the curved region CR1 is specified).

Note that, when it is not possible to acquire the map data and when a period, at which the driving assistance apparatus 5 acquires the location coordinates of the self-vehicle 1, is smaller in S1010, the curved region CR1 is specified more accurately. The driving assistance apparatus 5 may acquire the location coordinates at, for example, every several tens to several hundreds of milliseconds (msec) or every several seconds (sec).

Figure 3:
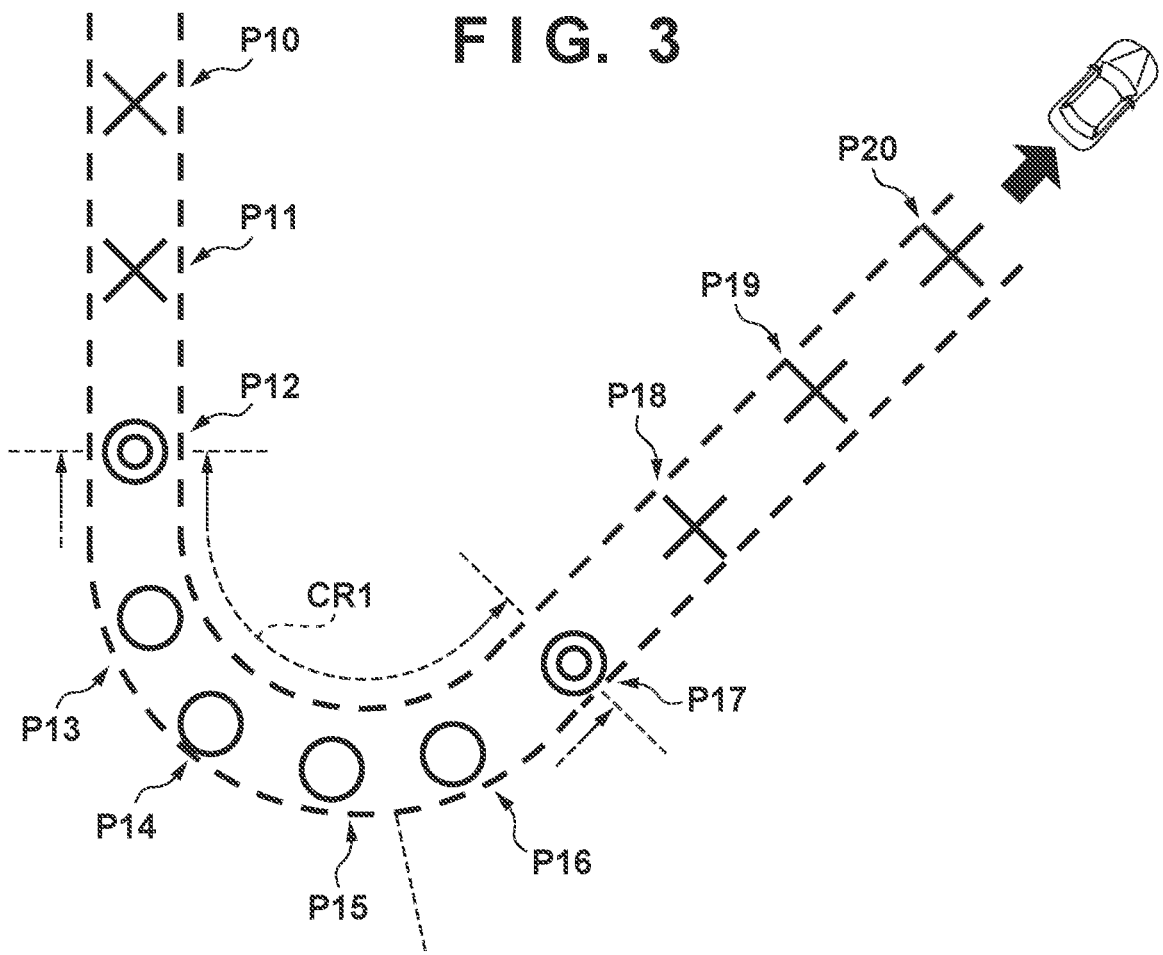
FIG. 3 is a schematic diagram illustrating an example of a method to specify a curved region.

FIG. 3 is a schematic diagram illustrating the method to specify the curved region CR1 in S1020. In FIG. 3, a plurality of the location coordinates (that have been continuously acquired in S1010) are plotted and virtually mapped. In this embodiment, the map data is not acquired, but for ease of understanding, a travel path is indicated with broken lines on the drawing of FIG. 3. FIG. 3 illustrates the location coordinates P10 to P20 (hereinafter, referred to as "location coordinates P10 and/or others). Among the location coordinates P10 and others, the one located on a path corresponding to the curved region CR1 is indicated with a circle; the one located at a start point or an end point of the curved region CR1 is indicated with a double circle; and each of the others is indicated with a cross.

Figure 7:
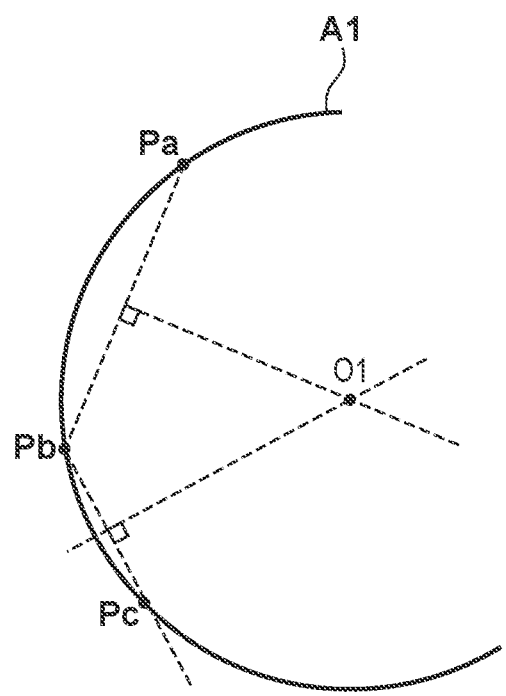
FIG. 7 is a diagram illustrating a method to obtain a circle passing through three optional points.

As illustrated in FIG. 7, it is possible to calculate a center point O1 and a radius r1 of a circular arc A1 by referring to three optional points Pa, Pb, and Pc of the circular arc A1. Accordingly, back in FIG. 3, by sequentially referring to three consecutive ones of the plurality of location coordinates P10 and others, it is possible to approximately calculate curvature radius of the travel path; and based on whether or not the curvature radius meets the standard, it is possible to determine whether or not the travel path corresponds to the curved region CR1.

FIG. 3 also includes a table of curvature radius R that has been calculated with the method described above for each of the three consecutive location coordinates P10 and others. In this embodiment, the curvature radius R is calculated based on a total of the three consecutive location coordinates, i.e., a corresponding one of the three consecutive location coordinates together with the other two ones of the three consecutive location coordinates that are respectively located before and after the corresponding one. On the drawing of FIG. 3, K represents any integer, and the curvature radius R in correspondence to location coordinate PK is denoted with a curvature radius RK. Thus, for example, a curvature radius $R_{15}$ of the location coordinate P15 is calculated based on the location coordinates P14, P15, and P16.

As another embodiment, the curvature radius R may be calculated based on a total of the three consecutive location coordinates, i.e., a corresponding one together with the other two, one located before and the other located after the corresponding one. For example, the curvature radius $R_{15}$ of the location coordinate P15 may be calculated based on the location coordinates P13, P14, and P15 (or P15, P16, and P17).

When the curvature radius R is smaller than a standard value $R_{REF}$, the driving assistance apparatus 5 determines that the region corresponds to the curved region CR1; and when the curvature radius R is not smaller than (is equal to or greater than) the standard value $R_{REF}$, the driving assistance apparatus 5 determines that the region does not correspond to the curved region CR1. In this embodiment, assumedly, the curvature radius R of a region between the plurality of location coordinates P13 to P16 is smaller than the standard value $R_{REF}$, so that the region is determined as the curved region CR1.

With this configuration, when the curvature radius R of the travel path, which has been specified based on the three consecutive ones of the plurality of location coordinates P10 and others, meets the standard, a first one (i.e., the location coordinate P12 here) of the three consecutive ones is specified as the start point of the curved region CR1.

On the other hand, when the curvature radius R of the travel path, which has been specified based on the three consecutive ones of the plurality of location coordinates P10 and others, does not meet the standard, a last one (i.e., the location coordinate P17 here) of the three consecutive ones is specified as the end point of the curved region CR1.

The start point and the end point are specified as has been described above, and the start point (indicated with the double circle), the end point (indicated with the double circle), and the location coordinates (each indicated with the circle) between these two points are sequentially connected to form a range. The range also has a predetermined width, and is specified as the curved region CR1. Note that, the start point P12 and the end point P17 are included as a part of the curved region CR1 in this embodiment, but may not be included in the curved region CR1 as another embodiment.

In this embodiment, when the vehicle 1 travels again in the curved region CR1 registered in the database DB in S1030, it is possible as needed to provide the driver with a predetermined alert reminder. With this configuration, in this embodiment, it is possible with a relatively simple configuration to achieve management of risks in the travel path.

Note that, in this embodiment, steps S1010 to S1050 for driving assistance are executed when the driving assistance apparatus 5 determines that it is not possible to acquire the map data in S1000. Alternatively, as another embodiment, these steps may be executed when some other condition is met. For example, when the information (or an amount of the information) acquired by the communication apparatus 3 does not meet the standard, the steps above for driving assistance may be executed.

First Example

Figure 4A:
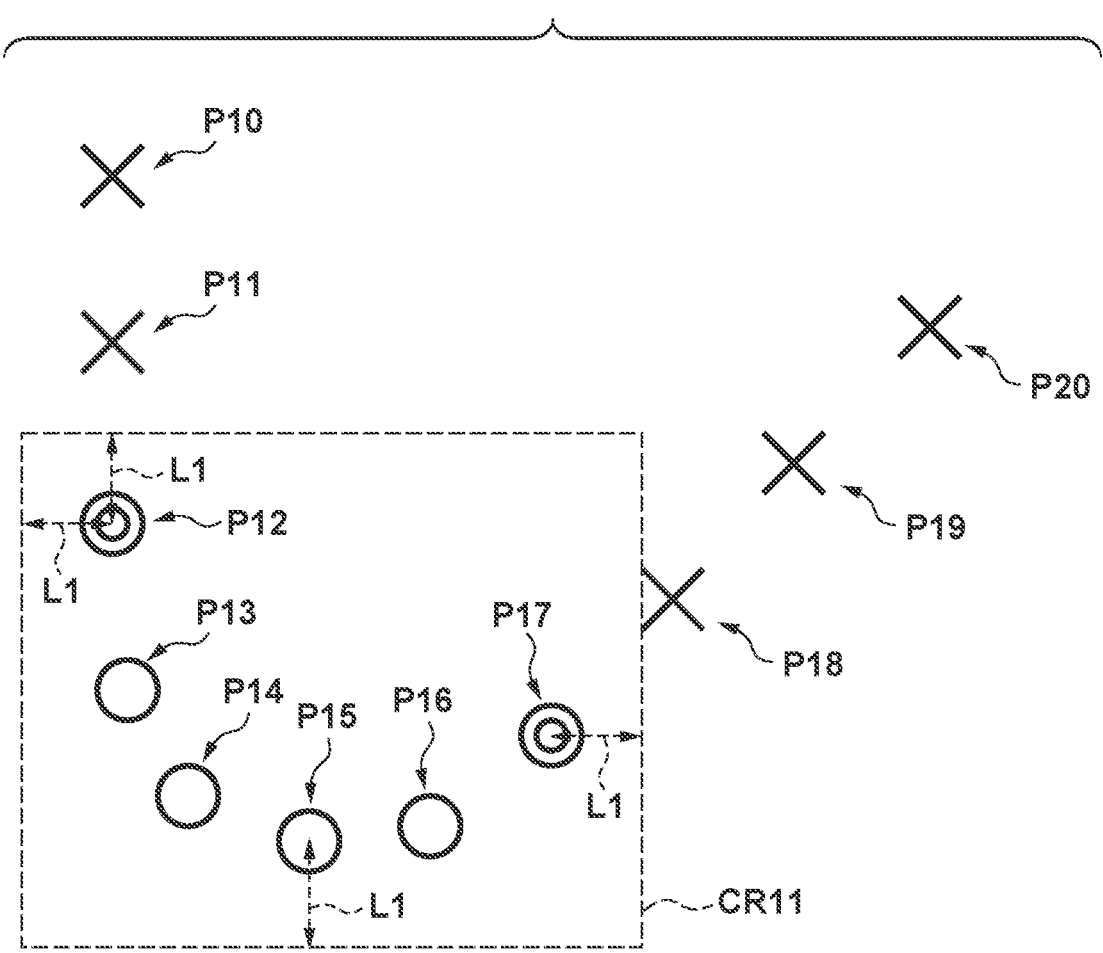
FIG. 4A is a schematic diagram illustrating another example of the method to specify the curved region.

As illustrated in FIG. 4A, the curved region CR1 may be specified by a two-dimensional outer shape. Alternatively, the curved region CR1 may be defined based on the plurality of location coordinates P12 to P17, each specified as described above. As an example, the curved region CR1 may be defined by a region CR11 of a rectangular shape.

For example, based on the plurality of location coordinates P12 to P17, the region CR11 has, as a right side $E_R$, a longitude located at a predetermined distance L1 from the easternmost one (i.e., P17 here) to the east side. Concurrently, the region CR11 has, as a left side $E_L$, a longitude located at the predetermined distance L1 from the westernmost one (i.e., P12 here) to the west side. The region CR11 has, as a lower side $E_D$, a latitude located at the predetermined distance L1 from the southernmost one (i.e., P15 here) to the south side. The region CR11 has, as an upper side $E_U$, a latitude located at the predetermined distance L1 from the northernmost one (i.e., P12 here) to the north side. The region CR11 is defined as has been described above and when the vehicle 1 travels in the region CR11, the driving assistance apparatus 5 need only provide the driver with the predetermined alert reminder in S1050.

Second Example

Figure 4B:
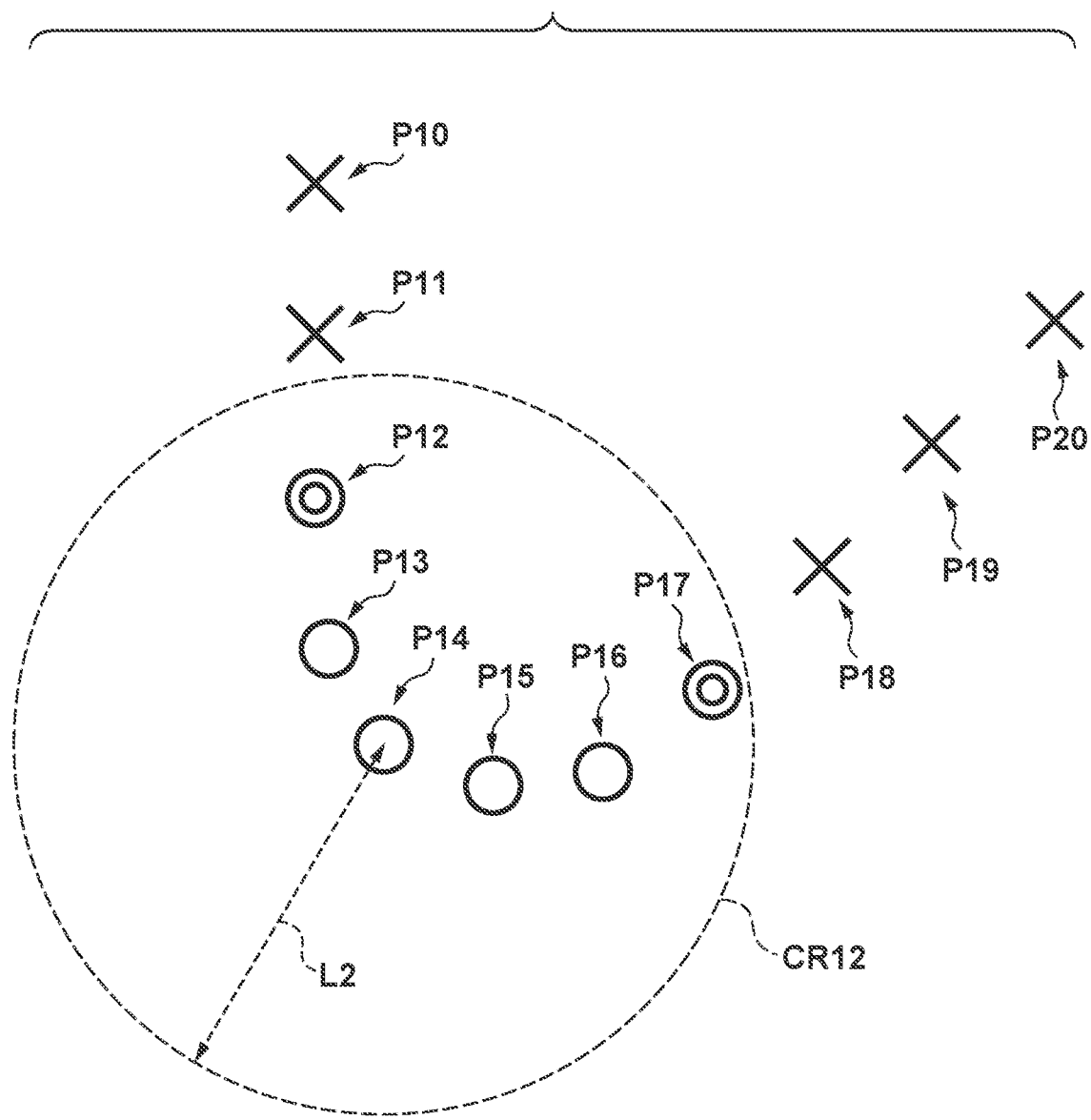
FIG. 4B is a schematic diagram illustrating a still another example of the method to specify the curved region.

As illustrated in FIG. 4B, the curved region CR1 may be defined in other manners. For example, a curved region CR12 may be specified as follows: the curvature radius R is specified with respect to each of the plurality of location coordinates P13 to P16; the location coordinate (P14 here) exhibiting the greatest curvature radius is specified; and a region, which is spaced at a predetermined distance L2 from the location coordinate P14 and includes all of the plurality of location coordinates P12 to P17, is specified as the curved region CR12. The predetermined distance L2 may be set, for example, such that a circle, centered at the location coordinate P14 and having a radius of the predetermined distance L2, does not include any other location coordinates but P12 to P17.

Third Example

Figure 4C:
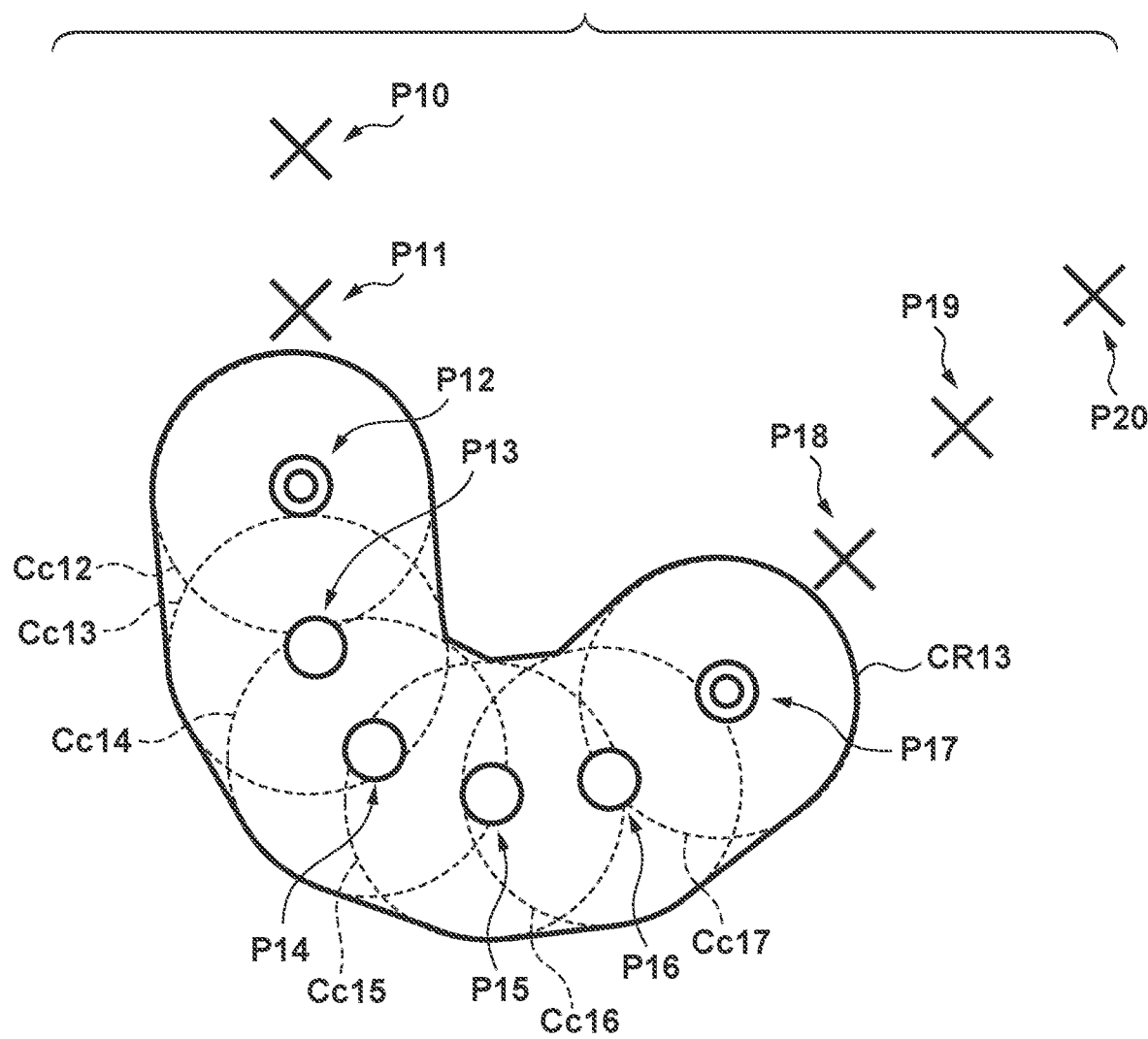
FIG. 4C is a schematic diagram illustrating a further still another example of the method to specify the curved region.

As illustrated in FIG. 4C, a curved region CR13 may be specified as follows: the curvature radius R is specified with respect to each of the plurality of location coordinates P12 to P17; a plurality of circles Cc12 to Cc17 are respectively centered at the plurality of location coordinates P12 to P17; and a region enveloping the plurality of circles Cc12 to Cc17 is specified as the curved region CR13. Each of diameters of the plurality of circles Cc12 to Cc17 need only be determined based on the corresponding curvature radius R. For example, the diameters of the plurality of circles Cc12 to Cc17 may be respectively determined based on values calculated from the curvature radii $R_{13}$ to $R_{16}$ (or $R_{12}$ to $R_{17}$), the values such as a maximum value, a minimum value, an average value, a median value, or a deviation.

In these methods, as the curved region CR1, any one of the region CR11, the curved region CR12, and the curved region CR13 is specified relatively simply based on the location coordinates.

Second Embodiment

In the foregoing first embodiment, when the map data is not acquired in the vehicle 1 via the communication apparatus 3 and when the driving assistance apparatus 5 has specified the curved region CR1, the driving assistance apparatus 5 registers the curved region CR1 in the database DB. Then, when the vehicle 1 travels again in the curved region CR1, the driving assistance apparatus 5 provides the driver with the predetermined alert reminder. Meanwhile, even when the map data is not acquired via the communication apparatus 3, as long as the communication apparatus 3 is configured to achieve the vehicle-to-vehicle communication or the road-to-vehicle communication, the driving assistance apparatus 5 may be configured to provide other forms of driving assistance.

Figure 5:
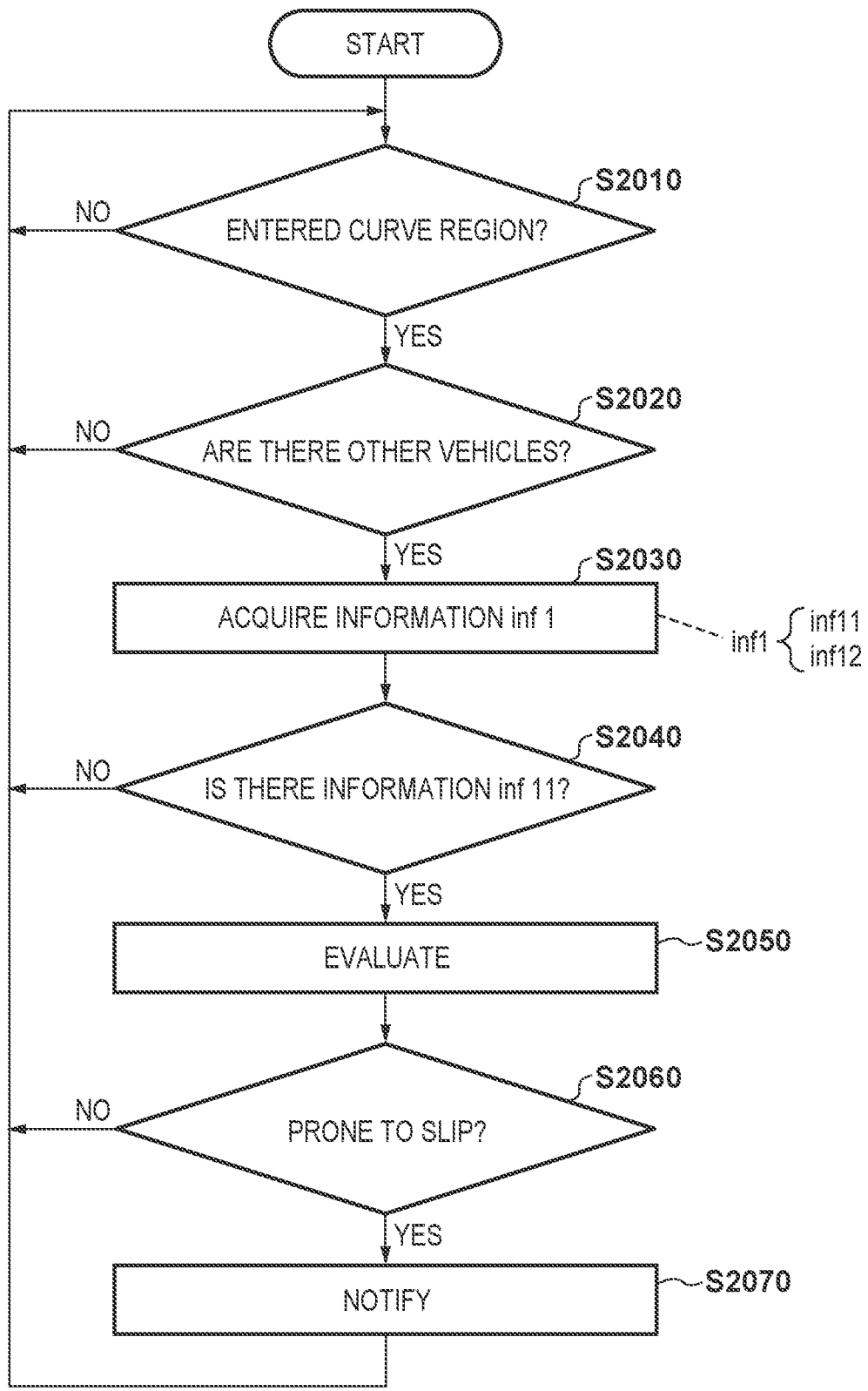
FIG. 5 is a flowchart describing another example of the content of the computational processing of the driving assistance apparatus.

FIG. 5 is a flowchart describing content of computational processing according to a second embodiment, similarly to the first embodiment (see FIG. 2). Steps of this flowchart are executed when the self-vehicle 1 travels in the curved region CR1 that has been registered in the database DB; and a summary of the steps is to acquire information regarding the curved region CR1 from other vehicles.

In S2010, the driving assistance apparatus 5 determines whether or not the self-vehicle 1 has entered the curved region CR1 that has been registered in the database DB. As has been described above (see the first embodiment), it is possible to specify the curved region CR1 based on the location coordinates. Thus, in S2010, it is possible to determine based on the location coordinates of the self-vehicle 1 acquired based on the GPS. When the self-vehicle 1 has entered the curved region CR1, the driving assistance apparatus 5 proceeds to S2020; and when the self-vehicle 1 has not entered the curved region CR1, the driving assistance apparatus 5 returns to S2010. In S2010, the CPU 51 functions as the determination unit.

In S2020, the driving assistance apparatus 5 determines whether or not there is any other vehicle that is communicable with the self-vehicle 1 via the communication apparatus 3. When one or more other vehicle(s) is/are communicable with the self-vehicle 1, the driving assistance apparatus 5 proceeds to S2030; and when there is no other vehicle communicable, the driving assistance apparatus 5 returns to S2010. Here, in many cases, the other vehicle communicable is currently traveling in the curved region CR1. Alternatively, the other vehicle may have already passed through the curved region CR1. For example, the other vehicle communicable may have already passed through the curved region CR1 and may thus be traveling outside the curved region CR1 with a history of traveling in the curved region CR1. In S2020, the driving assistance apparatus 5 may preferably determine whether or not any external object is communicable with the self-vehicle 1; and as another embodiment, the driving assistance apparatus 5 may determine whether or not any predetermined facility (e.g., a base station that transmits traffic information) is communicable with the self-vehicle 1. In S2020, the CPU 51 functions as the determination unit.

In S2030, the driving assistance apparatus 5 acquires information inf 1 regarding the curved region CR1 from the other vehicle via the communication apparatus 3. When there are two or more other vehicles, the information inf 1 may preferably be acquired from each of the other vehicles. The information inf 1 may include information inf 11 indicating risks in traveling and information inf 12 as auxiliary information related to the information inf 11. For example, the information inf 11 indicates an occurrence of slip of the other vehicle in the curved region CR1 and/or indicates a road surface condition of the curved region CR1. The information inf 12 indicates a travel state of the other vehicle at the occurrence of the slip. The information inf 12 indicates, as a typical example, speed of the other vehicle; and alternatively/incidentally, the information inf 12 indicates, as another typical example, acceleration of the other vehicle in a travel direction or in a vehicle width direction. Particularly, as the information regarding the occurrence of the slip, the information inf 12 may indicate the speed of the other vehicle as well as the acceleration of the other vehicle in the vehicle width direction. In S2030, the CPU 51 functions as the acquisition unit.

In S2040, the driving assistance apparatus 5 determines whether or not the information inf 1 acquired from the other vehicle in S2030 includes the information inf 11 (and the information inf 12 as the auxiliary information related to the information inf 11). When the information inf 1 includes the information inf 11, the driving assistance apparatus 5 proceeds to S2050; and when the information inf 1 does not include the information inf 11, the driving assistance apparatus 5 returns to S2010. In other words, when the other vehicle has the information regarding the occurrence of the slip, the driving assistance apparatus 5 proceeds to S2050; and when the other vehicle does not have the information regarding the occurrence of the slip, the driving assistance apparatus 5 returns to S2010. In S2040, the CPU 51 functions as the determination unit.

In S2050, the driving assistance apparatus 5 evaluates proneness of the self-vehicle 1 to slip in the curved region CR1 based on the information inf 12. The driving assistance apparatus 5 need only evaluate the proneness by checking travel condition of the self-vehicle 1 with travel condition of the other vehicle at the occurrence of the slip. As an example, the driving assistance apparatus 5 compares speed, acceleration in a travel direction, and/or acceleration in a vehicle width direction of the self-vehicle 1 with that/those of the other vehicle. Then, the driving assistance apparatus 5 may evaluate the proneness of the self-vehicle 1 to slip based on whether or not the speed, the acceleration in the travel direction, and/or the acceleration in the vehicle width direction of the self-vehicle 1 are/is within a range of the standard(s) (e.g., within ±20%), greater than upper limit value(s), or neither within the range of the standard(s) nor greater than the upper limit value(s). In S2050, the CPU 51 functions as an evaluation unit.

In S2060, the driving assistance apparatus 5 determines whether or not the proneness evaluated in S2050 meets the standard. On determination that the self-vehicle 1 is prone to slip, the driving assistance apparatus 5 proceeds to S2070; and on determination that the self-vehicle 1 is not prone to slip, the driving assistance apparatus 5 returns to S2010. In the foregoing example, in comparison of the speed, the acceleration in the travel direction, and/or the acceleration in the vehicle width direction of the self-vehicle 1 with that/those of the other vehicle, when these three items/any one of these three items of the self-vehicle 1 are/is within the range of the standard(s) or greater than the upper limit value(s), the driving assistance apparatus 5 determines that the self-vehicle 1 is prone to slip and thus proceeds to S2070; and when these three items/any one of these three items of the self-vehicle 1 are/is neither within the range of the standard(s) nor greater than the upper limit value(s), the driving assistance apparatus 5 returns to S2010. In S2060, the CPU 51 functions as the determination unit.

In S2070, the driving assistance apparatus 5 provides the driver with the notice predetermined. The notice may be provided via the in-vehicle display 9 or may alternatively/incidentally be provided via an audio guide or a warning alarm. Similarly to S1050, in S2070, the CPU 51 functions as the notification unit (or the notice output unit) or the display unit (or the display output unit).

In this embodiment, when the vehicle 1 travels in the curved region CR1, it is possible to provide the driver with the predetermined alert reminder based on the information inf 1 acquired from the other vehicle. Accordingly, in this embodiment, in addition to effects of the foregoing first embodiment, it is also possible to achieve the management of risks that may occur in the curved region CR1.

Third Embodiment

In the foregoing first embodiment, the curved region CR1 registered in the database DB accumulates, thereby reducing storage capacity of the memory 52. In such a case, it is generally preferable to preferentially delete, from the database DB, data with a low reference frequency.

Figure 6:
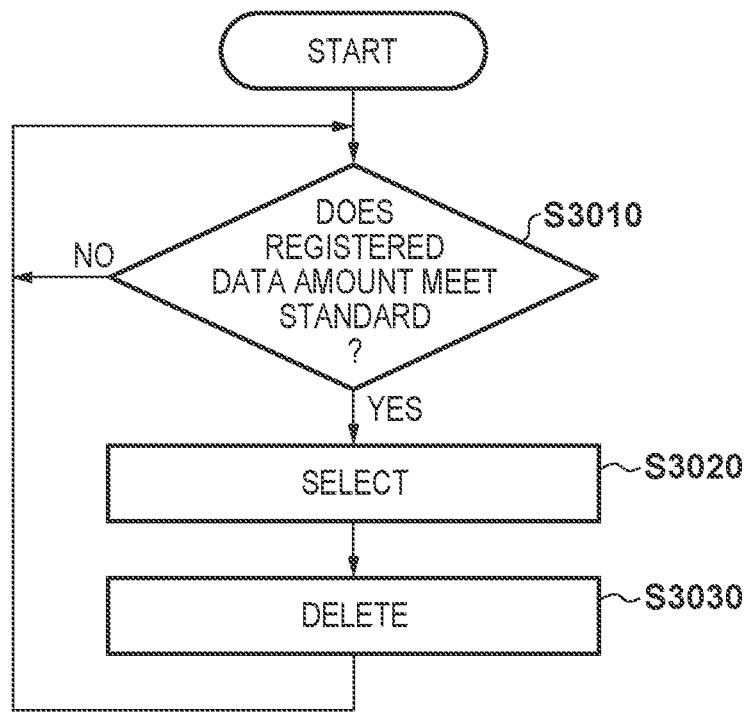
FIG. 6 is a flowchart describing a still another example of the content of the computational processing of the driving assistance apparatus.

FIG. 6 is a flowchart describing content of computational processing according to a third embodiment, similarly to the first embodiment (see FIG. 2). Steps of this flowchart are executed when the storage capacity of the memory 52 is equal to or smaller than the standard; and a summary of the steps is to delete the curved region CR1 from the database DB when the self-vehicle 1 has traveled the curved region CR1 less frequently than the standard.

In S3010, the driving assistance apparatus 5 determines whether or not an amount of the data registered in the database DB meets the standard (In other words, whether or not the storage capacity of the memory 52 is smaller than the standard). When the amount of the data registered in the database DB meets the standard (when the storage capacity of the memory 52 is smaller than the standard), the driving assistance apparatus 5 proceeds to S3020; and when the storage capacity of the memory 52 is not smaller than the standard, the driving assistance apparatus 5 returns to S3010. In S3010, the CPU 51 functions as the determination unit.

In S3020, the driving assistance apparatus 5 selects a part of the data registered in the database DB. In this embodiment, the driving assistance apparatus 5 selects the data regarding the curved region CR1 where the self-vehicle 1 has traveled less frequently than the standard. Alternatively/incidentally, the driving assistance apparatus 5 may select the data regarding the curved region CR1 where the self-vehicle 1 or the other vehicle has slipped less frequently than the standard. In S3020, the CPU 51 functions as a selection unit.

In S3030, the driving assistance apparatus 5 deletes the data selected in S3020. In S3030, the CPU 51 functions as a deletion unit.

In this embodiment, it is relatively simple to manage the data for the curved region CR1 that has been registered in the database DB.

In the foregoing descriptions, for ease of understanding, each element is denoted with a name related to its functional aspect, but the element is not limited to an element that has a content described in the foregoing embodiments as its main function, and may instead have the content as its complementary function. Therefore, each element is not strictly limited to the corresponding description, and each of the descriptions may be replaced with similar descriptions. Similarly, the "apparatus" may be referred to by other terms, such as a "unit", a "component", a "piece", a "member", a "structure", or an "assembly", or may alternatively be omitted.

Summary of Embodiments

Features of the foregoing embodiments may be summarized as follows.

A first aspect relates to a driving assistance apparatus (e.g., 5) mounted in a vehicle, the driving assistance apparatus including:

an acquisition unit configured to acquire (e.g., S1010) a location coordinate (e.g., P10 or others) of a self-vehicle (e.g., 1) at a predetermined period;

a specification unit configured, based on a plurality of the location coordinates acquired continuously by the acquisition unit, to specify (e.g., S1020) a curved region (e.g., CR1) of a road; and a registration unit configured to register (e.g., S1030) the curved region specified by the specification unit in a database (e.g., DB) predetermined. With this configuration, when the self-vehicle travels again in the curved region registered, it is possible as needed to provide a driver with a predetermined alert reminder; and it is thus possible with a relatively simple configuration to achieve management of risks in a travel path.

In a second aspect, the acquisition unit acquires the plurality of location coordinates based on a global positioning system (GPS). With this configuration, it is possible to achieve the first aspect relatively simply.

In a third aspect, the specification unit specifies the curved region without using map data for an area where the self-vehicle is traveling. With this configuration, even in a case where the map data is not prepared, a case where it is difficult to acquire the map data in the self-vehicle, or a case where the self-vehicle is not configured to acquire the map data, it is possible to achieve the first aspect relatively simply.

In a fourth aspect, when the self-vehicle travels in the curved region registered, the acquisition unit acquires, from another vehicle, information (e.g., inf 1 and inf 11) indicating an occurrence of a slip of the other vehicle in the curved region registered. With this configuration, it is possible to achieve the first aspect in a vehicle-to-vehicle communication.

In a fifth aspect, the information acquired from the other vehicle includes information (e.g., inf 1 and inf 11) indicating a road surface condition of the curved region registered. With this configuration, it is possible to appropriately achieve the management of the risks in the travel path.

In a sixth aspect, the information acquired from the other vehicle further includes information (e.g., inf 12) indicating a travel state of the other vehicle at the occurrence of the slip. With this configuration, it is possible to further appropriately achieve the management of the risks in the travel path.

In a seventh aspect, the information indicating the travel state of the other vehicle further includes information indicating a speed of the other vehicle, the driving assistance apparatus further including:

an evaluation unit configured, based on the information indicating the speed of the other vehicle, to evaluate (e.g., S2050) proneness of the self-vehicle to slip in the curved region registered; and a notification unit configured, based on the proneness of the self-vehicle to slip, the proneness evaluated by the evaluation unit, and a speed of the self-vehicle, to provide (e.g., S2070) a driver of the self-vehicle with a predetermined notice. With this configuration, it is possible to further appropriately achieve the management of the risks in the travel path.

In an eighth aspect, when the curvature radius of the travel path, the curvature radius being specified based on the three consecutive ones of the plurality of location coordinates, meets a standard, the specification unit specifies a first one of the three consecutive ones as a start point (e.g., P12) of the curved region. With this configuration, it is possible to specify the curved region relatively simply.

In a ninth aspect, when the curvature radius of the travel path, the curvature radius being specified based on the three consecutive ones of the plurality of location coordinates, does not meet the standard, the specification unit specifies a last one of the three consecutive ones as an end point (e.g., P17) of the curved region. With this configuration, it is possible to specify the curved region relatively simply.

In a tenth aspect, the specification unit specifies a rectangular shaped region as the curved region, the rectangular shaped region having: based on the plurality of location coordinates from the start point until the end point, as a right side (e.g., $E_R$), a longitude located at a predetermined distance (e.g., L1) from an easternmost one to an east side; as a left side (e.g., $E_L$), a longitude located at the predetermined distance from a westernmost one to a west side; as a lower side (e.g., $E_D$), a latitude located at the predetermined distance from a southernmost one to a south side; and as an upper side (e.g., $E_U$), a latitude located at the predetermined distance from a northernmost one to a north side. With this configuration, it is possible to specify the curved region relatively simply.

In an eleventh aspect, the specification unit specifies the curvature radius of the travel path based on the three consecutive ones with respect to each of the plurality of location coordinates from the start point until the end point, the specification unit specifies one of the plurality of location coordinates that corresponds to a greatest one of the curvature radii specified, and the specification unit specifies, as the curved region, a region that is spaced at a predetermined distance (e.g., L2) from the one of the plurality of location coordinates specified and that includes all of the plurality of location coordinates. With this configuration, it is possible to specify the curved region relatively simply.

In a twelfth aspect, the specification unit specifies the curvature radius of the travel path based on the three consecutive ones with respect to each of the plurality of location coordinates from the start point until the end point, and the specification unit specifies, as the curved region, a region that envelopes a plurality of circles (e.g., Cc 12 to Cc17), each having a diameter determined based on a corresponding one of the curvature radii specified and centered at a corresponding one of the plurality of location coordinates. With this configuration, it is possible to specify the curved region relatively simply.

In a thirteenth aspect, the driving assistance apparatus further including a deletion unit (e.g., S3030) configured, when an amount of data registered in the database by the registration unit meets a standard, to delete a part of the data, wherein when the self-vehicle has traveled the curved region registered less frequently than a standard, the deletion unit deletes the curved region registered from the database. With this configuration, it is relatively simple to manage the data for the curved region that has been registered.

In a fourteenth aspect, when the self-vehicle or the other vehicle has slipped in the curved region registered less frequently than a standard, the deletion unit deletes the curved region registered from the database. With this configuration, it is relatively simple to manage the data for the curved region that has been registered.

A fifteenth aspect relates to a vehicle (e.g., 1), the vehicle including:

the driving assistance apparatus (e.g., 5) according to the aspects above; and a wheel (e.g., 2). In other words, the driving assistance apparatus described above is applicable to a typical vehicle.

The invention is not limited to the foregoing embodiments, and various variations/changes are possible within the spirit of the invention.

What is claimed is:

1. A driving assistance apparatus in a vehicle, the driving assistance apparatus comprising at least one processor circuit with a memory comprising instructions, that when executed by the processor circuit, cause the at least one processor circuit to at least:

acquire a location coordinate of a self-vehicle at a predetermined period of time;

based on a plurality of the location coordinates acquired continuously, specify a curved region of a road; and register the curved region in a predetermined database, wherein when the self-vehicle travels in the registered curved region, information is acquired, from another vehicle, indicating an occurrence of a slip of the other vehicle in the registered curved region, the information acquired from the other vehicle further includes information indicating a travel state of the other vehicle at the occurrence of the slip, the information indicating the travel state of the other vehicle further includes information indicating a speed of the other vehicle, and the instructions further cause the at least one processor circuit to at least:

based on the information indicating the speed of the other vehicle, evaluate proneness of the self-vehicle to slip in the registered curved region; and based on the proneness of the self-vehicle to slip and a speed of the self-vehicle, provide a driver of the self-vehicle with a predetermined notice.

2. The driving assistance apparatus according to claim 1, wherein the plurality of location coordinates are acquired based on a global positioning system (GPS).

3. The driving assistance apparatus according to claim 1, wherein the curved region is specified without using map data for an area where the self-vehicle is traveling.

4. The driving assistance apparatus according to claim 1, wherein the information acquired from the other vehicle includes information indicating a road surface condition of the registered curved region.

5. The driving assistance apparatus according to claim 1, wherein a curvature radius of a travel path is specified based on three consecutive ones of the plurality of location coordinates, and when the curvature radius of the travel path, the curvature radius specified based on the three consecutive ones of the plurality of location coordinates, meets a standard, a first one of the three consecutive ones is specified as a start point of the curved region.

6. The driving assistance apparatus according to claim 5, wherein when the curvature radius of the travel path, the curvature radius being specified based on the three consecutive ones of the plurality of location coordinates, does not meet the standard, a last one of the three consecutive ones is specified as an end point of the curved region.

7. The driving assistance apparatus according to claim 6, wherein a rectangular shaped region is specified as the curved region, the rectangular shaped region having:

based on the plurality of location coordinates from the start point until the end point, as a right side, a longitude located at a predetermined distance from an easternmost one to an east side;

as a left side, a longitude located at the predetermined distance from a westernmost one to a west side;

as a lower side, a latitude located at the predetermined distance from a southernmost one to a south side; and as an upper side, a latitude located at the predetermined distance from a northernmost one to a north side.

8. The driving assistance apparatus according to claim 6, wherein the curvature radius of the travel path is specified based on the three consecutive ones with respect to each of the plurality of location coordinates from the start point until the end point, and a region that envelopes a plurality of circles is specified as the curved region, each having a diameter determined based on a corresponding one of the curvature radii specified and centered at a corresponding one of the plurality of location coordinates.

9. The driving assistance apparatus in the vehicle of claim 1, further comprising a wheel.

10. A driving assistance apparatus in a vehicle, the driving assistance apparatus comprising at least one processor circuit with a memory comprising instructions, that when executed by the processor circuit, cause the at least one processor circuit to at least:

acquire a location coordinate of a self-vehicle at a predetermined period of time;

based on a plurality of the location coordinates acquired continuously, specify a curved region of a road; and register the curved region specified in a predetermined database, wherein a curvature radius of a travel path is specified based on three consecutive ones of the plurality of location coordinates, when the curvature radius of the travel path, the curvature radius specified based on the three consecutive ones of the plurality of location coordinates, meets a standard, a first one of the three consecutive ones is specified as a start point of the curved region, when the curvature radius of the travel path, the curvature radius being specified based on the three consecutive ones of the plurality of location coordinates, does not meet the standard, a last one of the three consecutive ones is specified as an end point of the curved region, and the curvature radius of the travel path is specified based on the three consecutive ones with respect to each of the plurality of location coordinates from the start point until the end point, one of the plurality of location coordinates is specified that corresponds to a greatest one of the curvature radii specified, and, a region that is spaced at a predetermined distance from the one of the plurality of location coordinates specified and that includes all of the plurality of location coordinates is specified as the curved region.

11. A driving assistance apparatus in a vehicle, the driving assistance apparatus comprising at least one processor circuit with a memory comprising instructions, that when executed by the processor circuit, cause the at least one processor circuit to at least:

acquire a location coordinate of a self-vehicle at a predetermined period of time;

based on a plurality of the location coordinates acquired continuously, specify a curved region of a road;

register the curved region specified in a predetermined database; and when an amount of data registered in the database meets a standard, to delete a part of the data, wherein when the self-vehicle has traveled the curved region registered less frequently than a standard, the registered curved region is deleted from the database.

12. The driving assistance apparatus according to claim 11, wherein when the self-vehicle or the other vehicle has slipped in the registered curved region less frequently than a standard, the registered curved region is deleted from the database.

* * * * *